United States Patent
Elkayam et al.

(10) Patent No.: US 7,281,141 B2
(45) Date of Patent: Oct. 9, 2007

(54) BYPASS DISCHARGE PATH FOR A POWER SOURCING EQUIPMENT

(75) Inventors: Shimon Elkayam, Kfar Sava (IL); Amir Peleg, Tel Aviv (IL); Nadav Barnea, Neve Savion (IL); Dror Korcharz, Bat Yam (IL)

(73) Assignee: PowersDsine, Ltd.-Microsemi Corporation, Hod Hasharon (IL)

( * ) Notice: Subject to any disclaimer, the term of this patent is extended or adjusted under 35 U.S.C. 154(b) by 434 days.

(21) Appl. No.: 11/045,288

(22) Filed: Jan. 31, 2005

(65) Prior Publication Data
US 2006/0173581 A1    Aug. 3, 2006

(51) Int. Cl.
*G06F 1/26*    (2006.01)

(52) U.S. Cl. ...................... 713/300; 713/324; 713/340; 370/318

(58) Field of Classification Search ................. 713/300; 370/318
See application file for complete search history.

(56) References Cited

U.S. PATENT DOCUMENTS

| | | | |
|---|---|---|---|
| 4,517,618 A * | 5/1985 | Frank ........................... | 361/58 |
| 6,473,608 B1 | 10/2002 | Lehr et al. | |
| 6,643,566 B1 | 11/2003 | Lehr et al. | |
| 6,803,750 B2 * | 10/2004 | Zhang ......................... | 323/222 |
| 6,853,562 B2 * | 2/2005 | Zhang ...................... | 363/21.06 |
| 6,928,562 B2 * | 8/2005 | Cohen et al. ................ | 713/320 |
| 6,952,785 B1 * | 10/2005 | Diab et al. ................... | 713/300 |
| 7,141,958 B2 * | 11/2006 | Saitoh ......................... | 323/299 |
| 2005/0132240 A1 * | 6/2005 | Stineman et al. ........... | 713/300 |
| 2006/0049818 A1 * | 3/2006 | Montgomery ............... | 323/364 |

OTHER PUBLICATIONS

IEEE 802.3af-2003 Standard—Jun. 18, 2003, IEEE, N.Y.

* cited by examiner

*Primary Examiner*—Nitin C. Patel
(74) *Attorney, Agent, or Firm*—Simon Kahn (57) ABSTRACT

A method for preventing an excess voltage from appearing at an output of a power over Ethernet controller, the method comprising: sensing that a powered device has been disconnected from a port; enabling a bypass path around a means for unidirectional current flow operatively connected to the port; and disconnecting power to the port responsive to the sensed disconnect, whereby the bypass path enables a discharge path for an output capacitor present across the port. The invention also provides for a circuit having a bypass path around a means for unidirectional current flow, the bypass path being enabled by a control circuit to prevent an excess voltage from appearing at a sensing input of the control circuit. In an exemplary embodiment the bypass path is enabled approximately simultaneously with disconnecting power from the output port.

31 Claims, 5 Drawing Sheets

*Prior Art*

BYPASS DISCHARGE PATH FOR A POWER SOURCING EQUIPMENT

BACKGROUND OF THE INVENTION

The present invention relates to the field of powering ports, and more particularly to a powering circuit having a bypass path to prevent excess voltage during port disconnect.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power back-up; and centralized security and management.

Several patents addressed to this issue exist including: U.S. Pat. No. 6,473,608 issued to Lehr et al., whose contents are incorporated herein by reference and U.S. Pat. No. 6,643,566 issued to Lehr et al., whose contents are incorporated herein by reference. Furthermore a standard addressed to the issue of powering remote devices over an Ethernet based network has been published as IEEE 802.3af-2003, whose contents are incorporated herein by reference.

An Ethernet switch or midspan module providing power over Ethernet functionality is typically designed to support a plurality of ports, and power is preferably to be supplied to compatible equipment after detection. Power is typically supplied under control of a power over Ethernet controller, the power over Ethernet controller energizing for each port to be powered an electronically controlled switch, which in an exemplary embodiment comprises a power MOSFET. In another embodiment the electronically controlled switch comprises a FET or bipolar transistor. In order to reduce cost and minimize the footprint, preferably the required electronically controlled switches are provided embedded within the power over Ethernet controller. In another embodiment the required electronically controlled switches are provided external to the power over Ethernet controller, and are responsive to an output of the power over Ethernet controller.

After powering a port for which a valid attached powered device has been detected, the port is monitored for a valid maintain power signature (MPS). The above mentioned standard describes two MPS components; an AC MPS component and a DC MPS component. The power over Ethernet controller may optionally monitor the AC MPS component, the DC MPS component or both the AC and the DC MPS components. Implementation of the AC MPS component requires an AC signal source to be connected to the port. In the event that the power over Ethernet controller detects an absence of a valid monitored MPS component, power to the port is to be disconnected. Preferably, disconnection is to occur within 300-400 ms of the dropout of a valid monitored MPS component.

Figure 1:
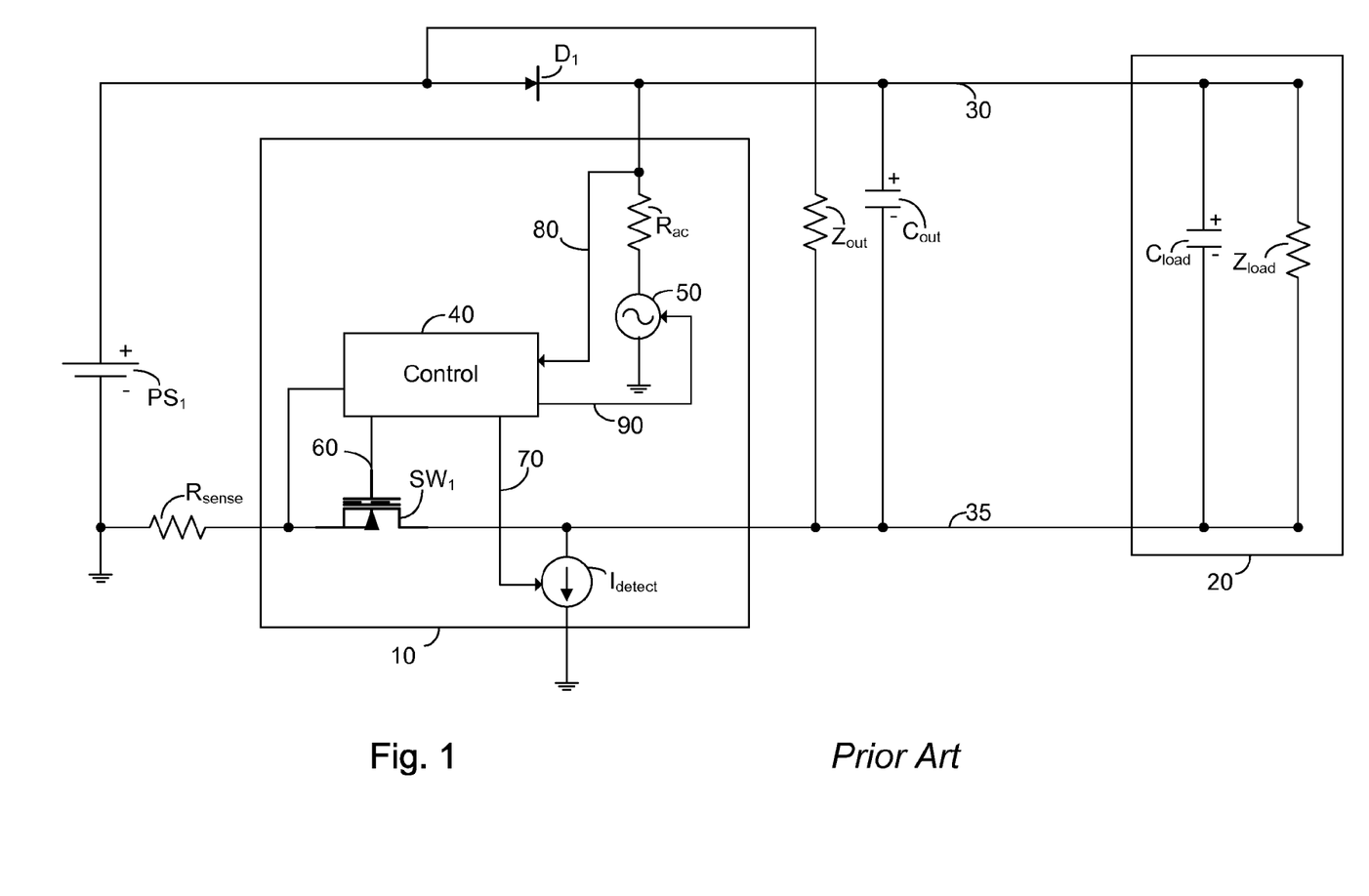
FIG. 1 is a high level schematic diagram of a power over Ethernet controller arranged to monitor an AC MPS component for disconnection of a powered device according to the prior art.

FIG. 1 illustrates a high level schematic diagram of a power over Ethernet controller arranged to monitor an AC MPS component for disconnection of a powered device according to the prior art. The system of FIG. 1 comprises power over Ethernet controller 10, powered device 20, first twisted pair 30, second twisted pair 35, power source $PS_1$, sense resistor $R_{sense}$, unidirectional current means $D_1$, output impendence $Z_{out}$ and output capacitor $C_{out}$. Power over Ethernet controller 10 comprises control circuit 40, AC signal source 50, AC signal source resistance $R_{ac}$, electronically controlled switch $SW_1$, detection source $I_{detect}$, control means 60, control means 70, sensing input 80 and control means 90. Powered device 20 comprises $C_{load}$ and $Z_{load}$. Electronically controlled switch $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. $C_{load}$ and $Z_{load}$ schematically represent the input capacitance and load, respectively, of powered device 20. In an exemplary embodiment $Z_{out}$ comprises a 45.3 K resistor and $C_{out}$ comprises a 0.2 µf capacitor.

Switch $SW_1$ is illustrated as being internal to power over Ethernet controller 10, typically as part of a single integrated circuit, however this is not meant to be limiting in any way. Switch $SW_1$ may be implemented externally to power over Ethernet controller 10 without exceeding the scope of the invention. Control means 60 may be a direct output of control circuit 40 or a circuit responsive thereto without exceeding the scope of the invention.

The positive of $PS_1$ is connected to the anode of unidirectional current means $D_1$ and a first end of $Z_{out}$. The cathode of unidirectional current means $D_1$ is connected to the positive side of $C_{out}$, control circuit 40 via sensing input 80, one end of $R_{ac}$ and a first end of first twisted pair 30. A second end of $R_{ac}$ is connected to the output of AC signal source 50, and the return of AC signal source 50 is connected to ground. The control input of AC signal source 50 is connected to control circuit 40 via control means 90. The control input of detection source $I_{detect}$ is connected to an output of control circuit 40 via control means 70. The gate of electronically controlled switch $SW_1$ is connected to an output of control circuit 40 via control means 60. The negative of $PS_1$ is connected to ground and one end of $R_{sense}$. A second end of $R_{sense}$ is connected to an input of control circuit 40 and to the drain of $SW_1$. The source of $SW_1$ is connected to one end of detection source $I_{detect}$, to the second end of $Z_{out}$, the negative side of $C_{out}$ and a first end of second twisted pair 35. The return of detection source $I_{detect}$ is connected to ground. A second end of first twisted pair 30 is connected to one end of $Z_{load}$ and the positive side $C_{load}$. A second end of $Z_{load}$ and the negative side of $C_{load}$ are connected to a second end of second twister pair 35.

In operation control circuit 40 operates detection source $I_{detect}$ through control means 70 to generate a plurality of current levels. The plurality of current levels flow through $Z_{load}$, if connected, thereby presenting a plurality of voltages sensed at sensing input 80. After detection and classification of a valid powered device 20, power from $PS_1$ is connected over first and second twisted pairs 30,35 by the operation of control means 60 to electronically controlled switch $SW_1$. AC signal source 50, operated via control means 90, supplies an AC MPS which is sensed at sensing input 80. Among other functions, unidirectional current means $D_1$ prevents the attenuation of the output of AC signal source 50 by blocking a connection to $PS_1$. Upon detection of an invalid MPS, i.e. the absence of a valid MPS, control circuit 40 operates control means 60 to open electronically controlled switch $SW_1$ thereby disabling power to the port.

It is to be understood by those skilled in the art that just prior to opening electronically controlled switch $SW_1$ capacitor $C_{out}$ is charged to nearly the output voltage of $PS_1$. In an exemplary embodiment, the output voltage of $PS_1$ is 48 volts. Upon the opening of electronically controlled switch $SW_1$ no discharge path is available for $C_{out}$ through $Z_{out}$, and thus the negative side of $C_{out}$ is at the same potential as the positive output of $PS_1$ in relation to ground. In particular, the positive side of $C_{out}$ is at approximately twice the potential of $PS_1$ in relation to ground. Since the positive side of $C_{out}$ is connected to sense input 80, control circuit 40 experiences an excess voltage well in excess of its normal operating range. Such an excess voltage can lead to damage or require the use of a substantial transient surge suppressor.

What is needed, and not supplied by the prior art, is a means from preventing excess voltage from appearing at an input to a power over Ethernet controller monitoring an MPS component by providing a path for discharging the output capacitor connected to the power over Ethernet controller.

SUMMARY OF THE INVENTION

Accordingly, it is a principal object of the present invention to overcome the disadvantages of prior art. This is provided in the present invention by providing a bypass path to the unidirectional current flow means preventing discharge of the output capacitor. The bypass path is operated by the control circuit just before, or contemporaneously with the disabling of power to the output port. Disabling of the output port may be in response to a received command or in response to as sensed invalid DC or AC MPS.

The invention provides for a circuit comprising: a means for receiving power; a control circuit; a first switching means responsive to the control circuit for alternatively connecting and disconnecting the received power to an output port; a source impedance operatively connected to present a source impedance associated with the output port in the event of the received power being connected by the first switching means to the output port; an output capacitor associated with the output port; a means for unidirectional current flow operatively connected between the source impedance and the output capacitor, the means for unidirectional current flow preventing discharge of the output capacitor through the source impedance in the event of the power being disconnected by the first switching means from the output port; and a second switching means responsive to the control circuit to alternatively enable and disable a bypass path respective to the means for unidirectional current flow, the control circuit being operative via the operation of the second switching means to enable the bypass path prior to or substantially simultaneously with the operation of the first switching means to disconnect the received power from the output port, whereby the bypass path enables a discharge path for the output capacitor via the source impedance.

In one embodiment the circuit further comprises line detection means responsive to the control circuit, the control circuit being further operative via the operation of the second switching means to disable the bypass path during operation of the line detection means. Preferably the line detection means comprises one of a controllable current source and a plurality of current sources.

In one embodiment the circuit further comprises a means for sensing a voltage at the output port, the means for sensing being operatively connected to the control circuit. Preferably the control circuit is operative to monitor a maintain power signature via the means for sensing. Further preferably the control circuit is operative to disconnect the power source from the output port responsive to an absence of the maintain power signature. Preferably the circuit further comprises a means for connecting a non-uniform signal to the output port, the control circuit sensing a condition of the non-uniform signal at the output port via the means for sensing. Further preferably the control circuit is operative responsive to a pre-determined condition of the sensed condition of the non-uniform signal at the output port to disconnect the received power from the output port. In an exemplary embodiment the source impedance is greater than 25K ohms.

The invention independently provides for a method for preventing an excess voltage from appearing at an output of a power over Ethernet controller, the method comprising: sensing that a powered device has been disconnected from a port; enabling a bypass path around a means for unidirectional current flow operatively connected to the port; and disconnecting power to the port responsive to the sensed disconnect, whereby the bypass path enables a discharge path for an output capacitor present across the port.

In one embodiment the method further comprises prior to the sensing, detecting a powered device connected to the port. Preferably the method further comprises prior to the sensing and subsequent to the detecting, connecting power to the port.

In another embodiment the sensing is responsive to a condition of a maintain power signature. Preferably the maintain power signature is one of an AC component and a DC component.

The invention independently provides for a circuit comprising: a control circuit; a means responsive to the control circuit for controlling a first switching means to alternatively connect and disconnect power to an output port; a means for connecting a source impedance to be associated with the output port in the event of the power being connected by the first switching means to the output port; a means for connecting an output capacitor to present an output capacitance associated with the output port; a means for connecting a means for unidirectional current flow between the source impedance and the output capacitor, the means for unidirectional current flow preventing discharge of the output capacitor through the source impedance in the event of the power being disconnected by the first switching means from the output port; and a means responsive to the control circuit for controlling a second switching means to alternatively enable and disable a bypass path respective to the means for unidirectional current flow, the control circuit being operative to operate the second switching means thereby enabling the bypass path prior to or substantially simultaneously with the operation of the first switching means to disconnect the power from the output port, whereby the bypass path enables a discharge path for the output capacitor via the source impedance.

In one embodiment the circuit further comprises line detection means responsive to the control circuit, the control circuit being further operative to disable the bypass path during operation of the line detection means. Preferably the line detection means comprises one of a controllable current source and a plurality of current sources.

In another embodiment the circuit further comprises a means for sensing a voltage at the output port, the means for sensing being operatively connected to the control circuit. Preferably the control circuit is operative to monitor a maintain power signature via the means for sensing. Further preferably the control circuit is operative via the means for controlling a first switching means to disconnect the power from the output port responsive to an absence of the maintain power signature.

The invention independently provides for a circuit comprising: a means for receiving power; a control circuit; a first switching means responsive to the control circuit for alternatively connecting and disconnecting the received power to an output port; a source impedance associated with the output port; an output capacitor associated with the output port; a means for unidirectional current flow operatively connected between the source impedance and the output capacitor, the means for unidirectional current flow being arranged to prevent discharge of the output capacitor through the source impedance in the event of the power being disconnected by the first switching means from the output port; and a second switching means responsive to the control circuit to alternatively enable and disable a bypass path respective to the means for unidirectional current flow, the control circuit being operative via operation of the second switching means to enable the bypass path prior to or substantially simultaneously with the operation of the first switching means to disconnect the received power from the output port, whereby the bypass path enables a discharge path for the output capacitor via the source impedance.

In one embodiment the circuit further comprises line detection means responsive to the control circuit, the control circuit being further operative via the operation of the second switching means to disable the bypass path during operation of the line detection means. Preferably the line detection means comprises one of a controllable current source and a plurality of current sources.

In another embodiment the circuit further comprises a means for sensing a voltage at the output port, the means for sensing being operatively connected to the control circuit. Preferably the control circuit is operative to monitor a maintain power signature via the means for sensing. Further preferably the control circuit is operative to disconnect the power source from the output port responsive to an absence of the maintain power signature. Preferably the circuit further comprises a means for connecting a non-uniform signal to the output port, the control circuit sensing a condition of the non-uniform signal at the output port via the means for sensing. Further preferably the control circuit is operative responsive to a pre-determined condition of the sensed condition of the non-uniform signal at the output port to disconnect the received power from the output port. In an exemplary embodiment the source impedance is greater than 25K ohms.

The invention also independently provides for a power over Ethernet controller comprising: a means for receiving power; a control circuit; a first switching means responsive to the control circuit for alternatively connecting and disconnecting the received power to an output port; a source impedance operatively connected to present an output impedance associated with the output port; an output capacitor operatively connected to present an output capacitance associated with the output port; a means for unidirectional current flow operatively connected between the source impedance and the output capacitor, the means for unidirectional current flow being arranged to prevent discharge of the output capacitor through the source impedance in the event of the power being disconnected by the first switching means from the output port; and a second switching means responsive to the control circuit to alternatively enable and disable a bypass path respective to the means for unidirectional current flow, the control circuit being operative via operation of the second switching means to enable the bypass path prior to or substantially simultaneously with the operation of the first switching means to disconnect the received power from the output port, whereby the bypass path enables a discharge path for the output capacitor via the source impedance.

The invention also independently provides for a method for preventing an excess voltage from appearing at an output of a power over Ethernet controller, the method comprising: enabling a bypass path around a means for unidirectional current flow operatively connected to the port; and disconnecting power to the port responsive to the sensed disconnect, whereby the bypass path enables a discharge path for an output capacitor present across the port.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

The present embodiments enable a bypass path to a unidirectional current flow means, which is herein illustrated as a diode, connected in a manner that prevents the discharge of an output capacitor through the source impedance. The invention is being described in relation to a power over Ethernet controller, without being limiting in any way. The invention is equally applicable to other circuits in which a means for unidirectional current is present preventing the discharge of an output capacitor.

The bypass path is operated by a control circuit of the power over Ethernet controller just before, or substantially contemporaneously with, the disabling of power to the output port. In an exemplary embodiment disabling of power to the output port occurs in response to a sensed disconnect of a connected powered device. In one embodiment the sensed disconnect is a result of sensing the lack of a valid MPS. The lack of a valid MPS is herein interchangeably denoted an invalid MPS. The bypass path prevents an excess voltage from appearing at the control circuit by providing a discharge path for the output capacitor associated with the power over Ethernet controller.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
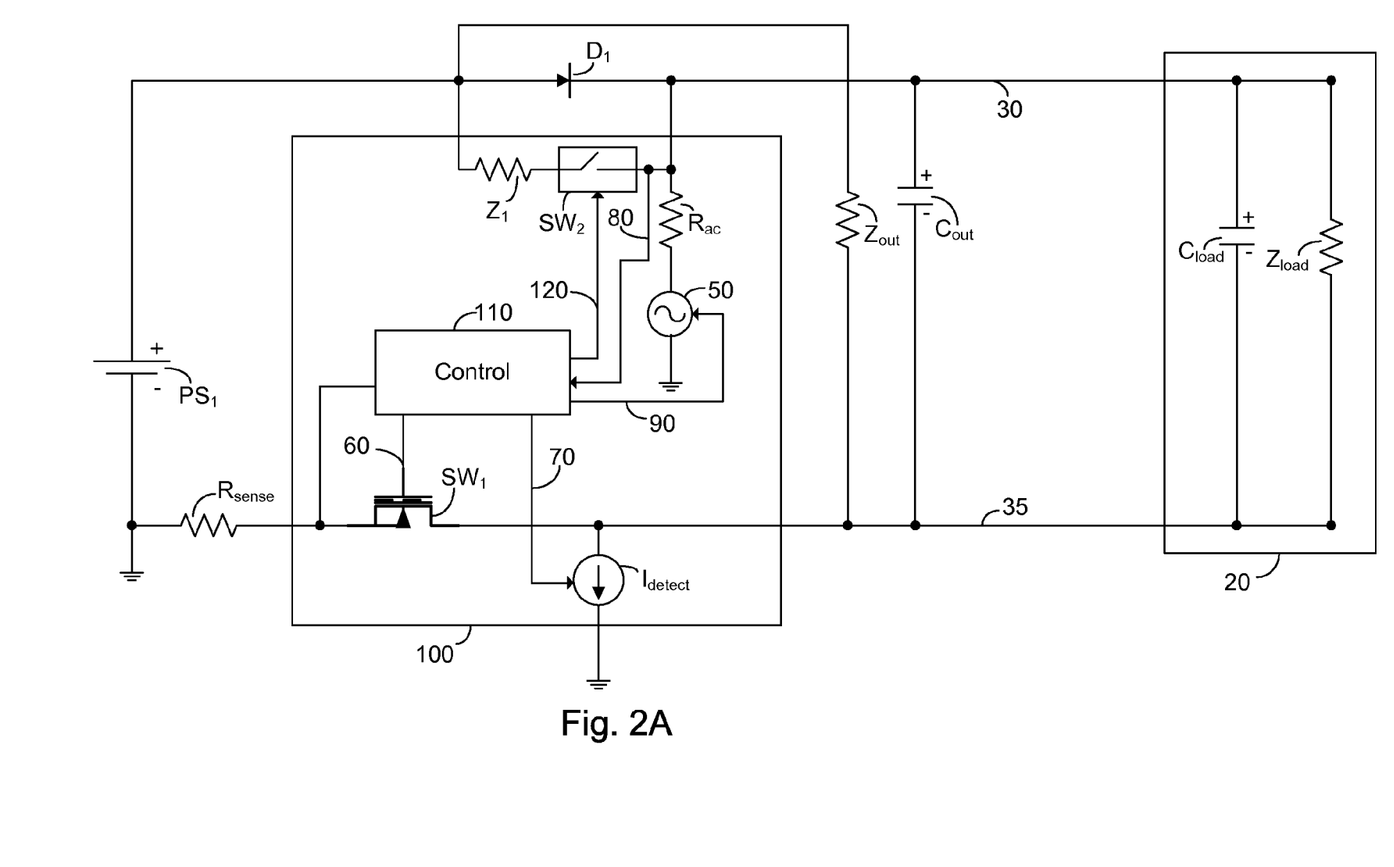
FIG. 2a is a high level schematic diagram of a first embodiment of a power over Ethernet controller arranged to monitor an AC MPS component for disconnection of a powered device, the power over Ethernet controller providing a bypass path in accordance with the principle of the invention.

FIG. 2a is a high level schematic diagram of a first embodiment of a power over Ethernet controller arranged to monitor an AC MPS component for disconnection of a powered device, power over Ethernet controller 100 providing a bypass path in accordance with the principle of the invention. The system of FIG. 2a comprises power over Ethernet controller 100, powered device 20, first twisted pair 30, second twisted pair 35, power source $PS_1$, sense resistor $R_{sense}$, unidirectional current means $D_1$, output impendence $Z_{out}$ and output capacitor $C_{out}$. Power over Ethernet controller 100 comprises control circuit 110, AC signal source 50, AC signal source resistance $R_{ac}$, electronically controlled switch $SW_1$, detection source $I_{detect}$, control means 60, control means 70, sensing input 80, control means 90, bypass path switch $SW_2$, bypass path impedance $Z_1$ and bypass control means 120. Powered device 20 comprises $C_{load}$ and $Z_{load}$. $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. $C_{load}$ and $Z_{load}$ schematically represent the input capacitor and load, respectively, of powered device 20. Unidirectional current means $D_1$ is illustrated as a diode, however this is not meant to be limiting in any way and may be implemented as an ideal diode, FET or transistor without exceeding the scope of the invention.

The positive of $PS_1$ is connected to the anode of unidirectional current means $D_1$, a first end of bypass path impedance $Z_1$ and a first end of $Z_{out}$. The cathode of unidirectional current means $D_1$ is connected to the positive side of $C_{out}$, control circuit 110 via sensing input 80, a first lead of bypass path switch $SW_2$, one end of $R_{ac}$ and a first end of first twisted pair 30. A second lead of bypass path switch $SW_2$ is connected to a second end of bypass path impedance $Z_1$. The control input of bypass path switch $SW_2$ is connect to control circuit 110 by control means 120. A second end of $R_{ac}$ is connected to the output of AC signal source 50, and the return of AC signal source 50 is connected to ground. The control input of AC signal source 50 is connected to control circuit 110 via control means 90. The control input of detection source $I_{detect}$ is connected to an output of control circuit 110 via control means 70. The gate of electronically controlled switch $SW_1$ is connected to an output of control circuit 110 via control means 60. The negative of $PS_1$ is connected to ground and one end of $R_{sense}$. A second end of $R_{sense}$ is connected to an input of control circuit 110 and to the drain of $SW_1$. The source of $SW_1$ is connected to one end of detection source $I_{detect}$, to the second end of $Z_{out}$, the negative side of $C_{out}$ and a first end of second twisted pair 35. The return of detection source $I_{detect}$ is connected to ground. A second end of first twisted pair 30 is connected to one end of $Z_{load}$ and the positive side $C_{load}$. A second end of $Z_{load}$ and the negative side of $C_{load}$ are connected to a second end of second twister pair 35.

In operation control circuit 110 operates in all respects similarly to that of control circuit 40 of FIG. 1 with the exception of the operation of the bypass path comprising bypass path switch $SW_2$ and bypass path impedance $Z_1$. In an exemplary embodiment bypass path impedance $Z_1$ comprises a 2K resistor and bypass path switch $SW_2$ comprises an FET. Prior to, or contemporaneously with the opening of switch $SW_1$, bypass path switch $SW_2$ is closed thereby providing a bypass path around unidirectional current means $D_1$. The bypass path ensures that voltage at the input to control circuit 110 does not exceed the rated voltage as the combination of $Z_{out}$ and bypass path impedance $Z_1$ provides a discharge path for $C_{out}$. Early discharge of $C_{out}$ is further advantageous to enable early detection of a newly connected valid powered device 20.

Bypass switch $SW_2$ may remain closed until operation of line detection source $I_{detect}$ is desired. Preferably, bypass path switch $SW_2$ is closed only during the period that $SW_1$ is open and line detection source $I_{detect}$ is not operational. In an exemplary embodiment, AC signal source 50 is operational whenever $SW_1$ is closed.

Table I illustrates an exemplary embodiment of the logic of operation of control means 120 to operate bypass path switch $SW_2$.

TABLE I

| Control Means 60 ($SW_1$) | Control means 70 ($I_{detect}$) | Control Means 120 ($SW_2$) |
|---|---|---|
| Enable | Off | Disable |
| Enable | Active | Disable |
| Disable | Off | Enable |
| Disable | Active | Disable |

It is to be noted that the above table may implemented in a NOR gate. It is further noted that the condition of the second line, namely control means 60 is enabled and control means 70 is active, is not a normal operational condition and may contraindicated.

Figure 2B:
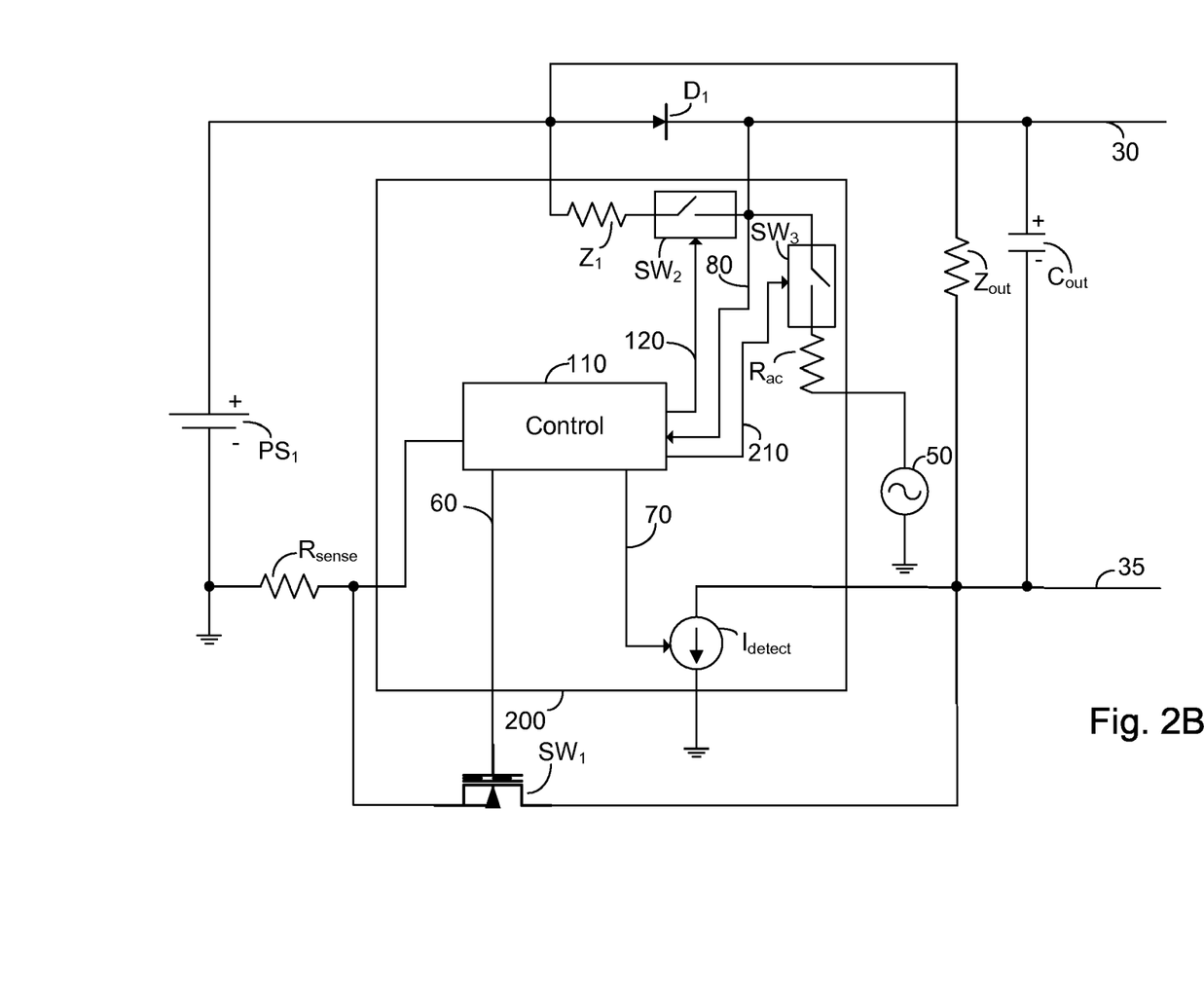
FIG. 2b is a high level schematic diagram of a second embodiment of a power over Ethernet controller arranged to monitor an AC MPS component for disconnection of a powered device, the power over Ethernet controller providing a bypass path in accordance with the principle of the invention.

FIG. 2b is a high level schematic diagram of a second embodiment of a power over Ethernet controller arranged to monitor an AC MPS component for disconnection of a powered device, power over Ethernet controller 200 providing a bypass path in accordance with the principle of the invention. Power over Etherent controller 200 is illustrated with associated first twisted pair 30 and second twisted pair 35, power source $PS_1$, sense resistor $R_{sense}$, unidirectional current means $D_1$, output impendence $Z_{out}$, output capacitor $C_{out}$, AC signal source 50 and electronically controlled switch $SW_1$. Power over Ethernet controller 200 comprises control circuit 110, AC signal source resistance $R_{ac}$, detection source $I_{detect}$, control means 60, control means 70, sensing input 80, control means 210, AC signal control switch $SW_3$, bypass path switch $SW_2$, bypass path impedance $Z_1$ and bypass control means 120. $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling and represent the output port. Unidirectional current means $D_1$ is illustrated as a diode, however this is not meant to be limiting in any way and may be implemented as an ideal diode, FET or transistor without exceeding the scope of the invention.

The positive of $PS_1$ is connected to the anode of unidirectional current means $D_1$, a first end of bypass path impedance $Z_1$ and a first end of $Z_{out}$. The cathode of unidirectional current means $D_1$ is connected to the positive side of $C_{out}$, control circuit 110 via sensing input 80, a first lead of bypass path switch $SW_2$, a first lead of AC control switch $SW_3$ and first twisted pair 30. A second lead of bypass path switch $SW_2$ is connected to a second end of bypass path impedance $Z_1$. The control input of bypass path switch $SW_2$ is connected to control circuit 110 by control means 120. A second lead of AC control switch $SW_3$ is connected to a first end of $R_{ac}$, a second end of $R_{ac}$ is connected to the output of AC signal source 50 and the return of AC signal source 50 is connected to ground. The control input of AC control switch $SW_3$ is connected to an output of control circuit 110 by control means 210. The control input of detection source $I_{detect}$ is connected to an output of control circuit 110 via control means 70. The gate of electronically controlled switch $SW_1$ is connected to an output of control circuit 110 via control means 60. The negative of $PS_1$ is connected to ground and one end of $R_{sense}$. A second end of $R_{sense}$ is connected to an input of control circuit 110 and to the drain of $SW_1$. The source of $SW_1$ is connected to one end of detection source $I_{detect}$, to the second end of $Z_{out}$, the negative side of $C_{out}$ and second twisted pair 35. The return of detection source $I_{detect}$ is connected to ground.

The operation of power over Ethernet controller 200 is similar in all respects to that of Power over Ethernet controller 100 of FIG. 2a. Power over Ethernet controller 200 differs from power over Ethernet controller 100 of FIG. 2a by having electronically controlled switch $SW_1$ and AC signal source 50 external to power over Ethernet controller 200.

Figure 2C:
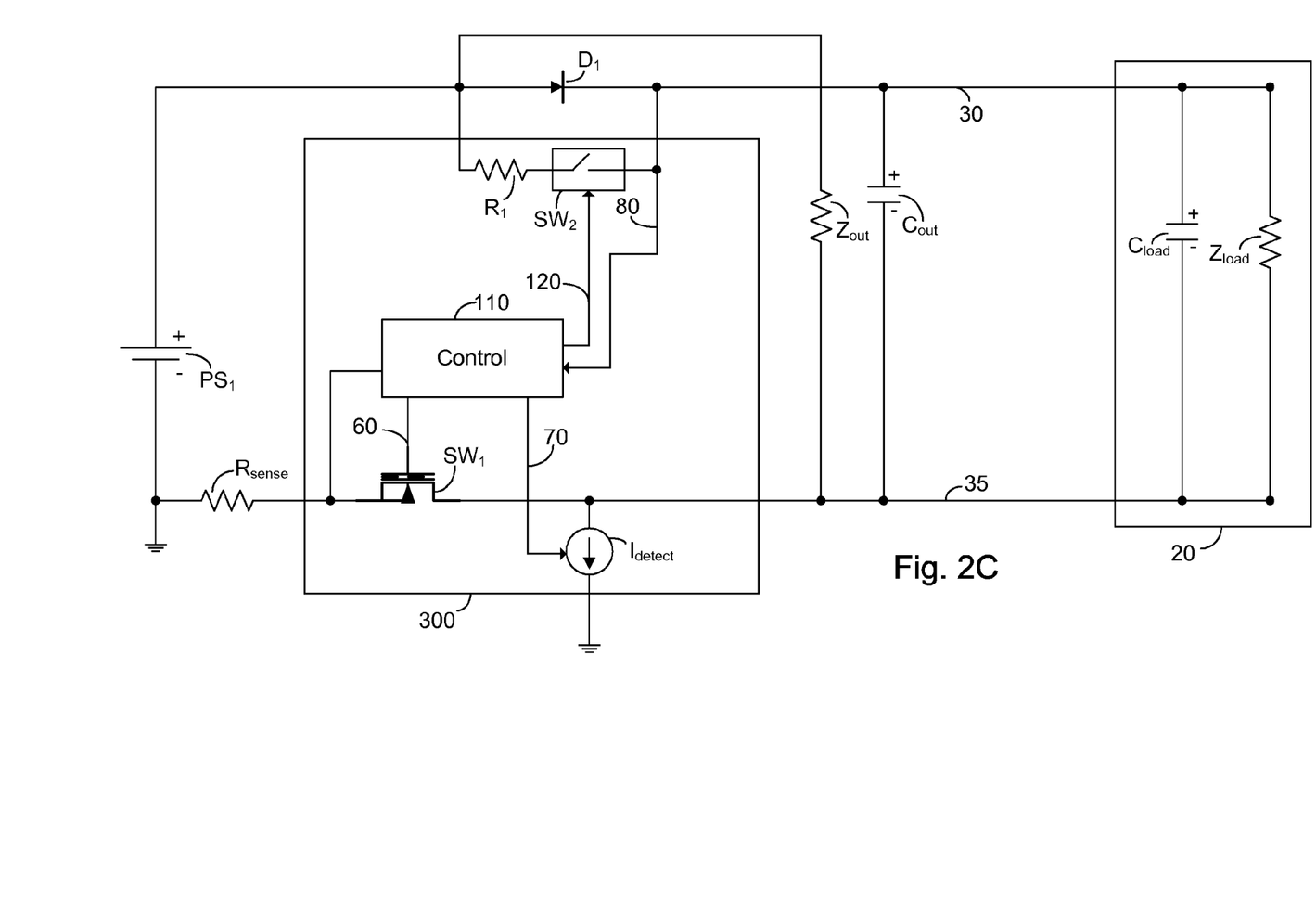
FIG. 2c is a high level schematic diagram of an embodiment of a power over Ethernet controller arranged to monitor a DC MPS component for disconnection of a powered device, the power over Ethernet controller providing a bypass path in accordance with the principle of the invention.

FIG. 2c is a high level schematic diagram of an embodiment of a power over Ethernet controller arranged to monitor a DC MPS component for disconnection of a powered device, power over Ethernet controller 300 providing a bypass path in accordance with the principle of the invention. The system of FIG. 2c comprises power over Ethernet controller 300, powered device 20, first twisted pair 30 and second twisted pair 35, power source $PS_1$, sense resistor $R_{sense}$, unidirectional current means $D_1$, output impendence $Z_{out}$ and output capacitor $C_{out}$. Power over Ethernet controller 300 comprises control circuit 110, electronically controlled switch $SW_1$, detection source $I_{detect}$, control means 60, control means 70, sensing input 80, bypass path switch $SW_2$, bypass path impedance $Z_1$ and bypass control means 120. Powered device 20 comprises $C_{load}$ and $Z_{load}$. $SW_1$ is illustrated as a power MOSFET, however this is not meant to be limiting in any way. $SW_1$ may be implemented as a FET or bipolar transistor without exceeding the scope of the invention. Detection source $I_{detect}$ is illustrated as being a variable current source, however this is not meant to be limiting in any way. Detection source $I_{detect}$ may be implemented as a voltage source or as a plurality of current sources without exceeding the scope of the invention. Twisted pairs 30 and 35 form part of a single structured communication cabling. $C_{load}$ and $Z_{load}$ schematically represent the input capacitor and load, respectively, of powered device 20. Unidirectional current means $D_1$ is illustrated as a diode, however this is not meant to be limiting in any way and may be implemented as an ideal diode, FET or transistor without exceeding the scope of the invention.

The positive of $PS_1$ is connected to the anode of unidirectional current means $D_1$, a first end of bypass path impedance $Z_1$ and a first end of $Z_{out}$. The cathode of unidirectional current means $D_1$ is connected to the positive side of $C_{out}$, control circuit 110 via sensing input 80, a first lead of bypass path switch $SW_2$ and a first end of first twisted pair 30. A second lead of bypass path switch $SW_2$ is connected to a second end of bypass path impedance $Z_1$. The control input of bypass path switch $SW_2$ is connected to control circuit 110 by control means 120. The control input of detection source $I_{detect}$ is connected to an output of control circuit 110 via control means 70. The gate of electronically controlled switch $SW_1$ is connected to an output of control circuit 110 via control means 60. The negative of $PS_1$ is connected to ground and one end of $R_{sense}$. A second end of $R_{sense}$ is connected to an input of control circuit 110 and to the drain of $SW_1$. The source of $SW_1$ is connected to one end of detection source $I_{detect}$, to the second end of $Z_{out}$, the negative side of $C_{out}$ and a first end of second twisted pair 35. The return of detection source $I_{detect}$ is connected to ground. A second end of first twisted pair 30 is connected to one end of $Z_{load}$ and the positive side $C_{load}$. A second end of $Z_{load}$ and the negative side of $C_{load}$ are connected to a second end of second twisted pair 35.

In operation control circuit 110 of FIG. 2c operates in all respects similarly to that of control circuit 40 of FIG. 1 with the exception of the operation of the bypass path comprising bypass path switch $SW_2$ and bypass path impedance $Z_1$ and the operation to monitor a DC MPS. In an exemplary embodiment bypass path impedance $Z_1$ comprises a 2K resistor, and bypass path switch $SW_2$ comprises an FET. Prior to, or contemporaneously with the opening of switch $SW_1$, bypass path switch $SW_2$ is closed thereby providing a bypass path around unidirectional current means $D_1$. The bypass path ensures that voltage at the input to control circuit 110 does not exceed the rated voltage as the combination of $Z_{out}$ and bypass path impedance $Z_1$ provides a discharge path for $C_{out}$. Early discharge of $C_{out}$ is further advantageous to enable early detection of newly connected valid powered device 20.

Bypass switch $SW_2$ may remain closed until operation of line detection source $I_{detect}$ is desired. Preferably, bypass path switch $SW_2$ is closed only during the period that $SW_1$ is open and line detection source $I_{detect}$ is not operational.

Table II illustrates an exemplary embodiment of the logic of operation of control means 120 to operated bypass path switch $SW_2$.

TABLE II

| Control Means 60 ($SW_1$) | Control means 70 ($I_{detect}$) | Control Means 120 ($SW_2$) |
|---|---|---|
| Enable | Off | Disable |
| Enable | Active | Disable |
| Disable | Off | Enable |
| Disable | Active | Disable |

It is to be noted that the above table may implemented in a NOR gate. It is further noted that the condition of the second line, namely control means 60 is enabled and control means 70 is active, is not a normal operational condition and may contraindicated.

Figure 3:
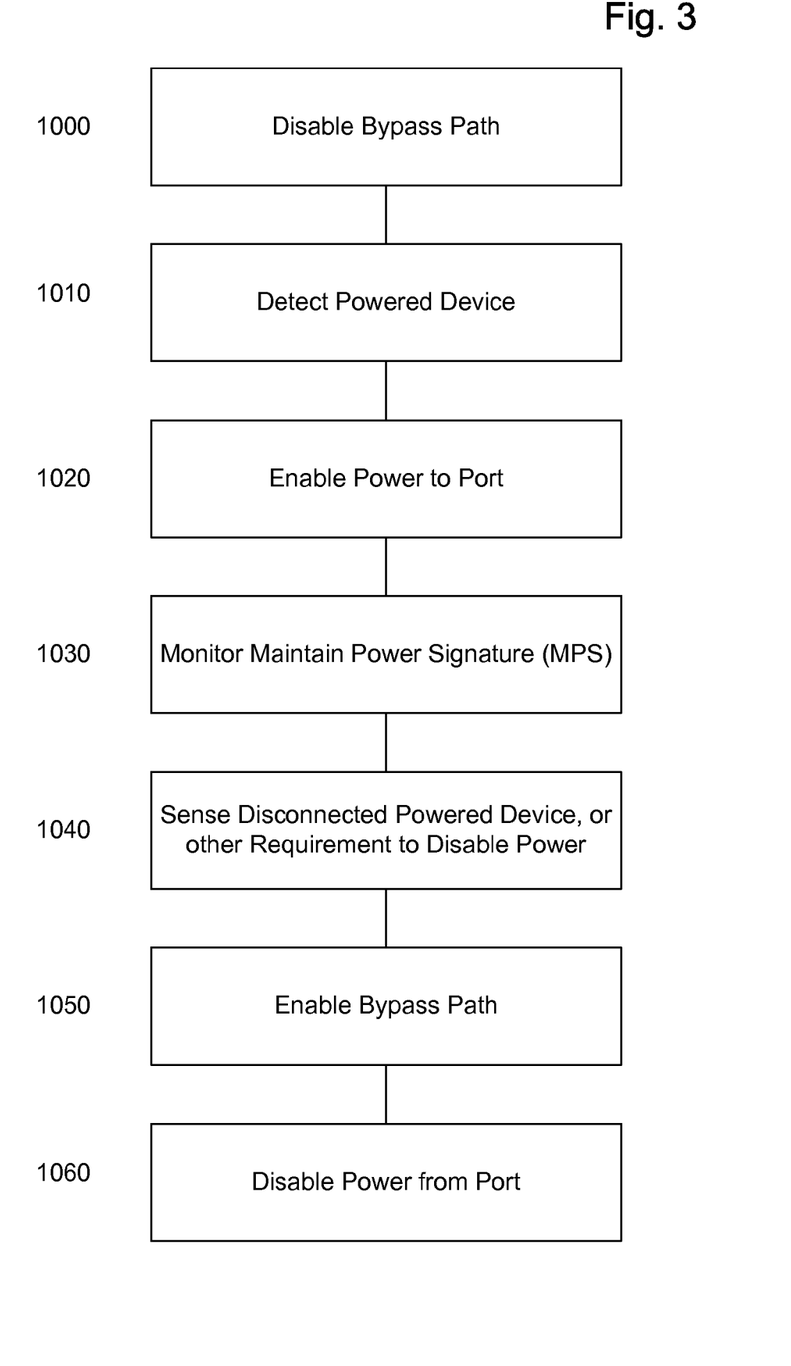
FIG. 3 illustrates a high level flow chart of an embodiment of the operation of the control circuit of the power over Ethernet controller of FIGS. 2a-2c in accordance with the principle of the invention.

FIG. 3 illustrates a high level flow chart of an embodiment of the operation of control circuit 110 of the respective power over Ethernet controller 100, 200, 300 of FIGS. 2a-2c in accordance with the principle of the invention. In stage 1000 a bypass path is disabled. In an exemplary embodiment the bypass path comprises bypass switch $SW_2$ and bypass path impedance $Z_1$, and is disabled via control means 120. In stage 1010 a valid powered device is detected. In an exemplary embodiment this is accomplished via detection source $I_{detect}$ operated through control means 70. It is to be noted that the bypass path is disabled to improve the operation of the detection circuit, and in some embodiments may not be required. In stage 1020 power is enabled to the port. In an exemplary embodiment this is accomplished by enabling switch $SW_1$ via control means 60.

In stage 1030 an MPS is monitored. In an exemplary embodiment in which an AC source is used as described above in relation to FIGS. 2a and 2b this is accomplished by enabling AC source 50 through control means 90, and monitoring the resultant AC voltage through sense input 80. In the embodiment of FIG. 2c a DC MPS is monitored through sense input 80.

In stage 1040 a disconnected port is sensed, or a disconnect port command is received. In an exemplary embodiment a disconnected port is sensed as a result of the monitored MPS of stage 1030, in particular the lack of one or more of an AC and DC MPS. A disconnect port command may be received due to a shortage of power, a loss of power, or the connection and detection of a valid powered device having a higher priority than the priority of the current port.

In stage 1050 a bypass path is enabled bypassing unidirectional current means $D_1$. In an exemplary embodiment this is accomplished by enabling bypass path switch $SW_2$ via control means 120. In stage 1060 power is disabled to the port. In an exemplary embodiment this is accomplished by disabling, or opening, switch $SW_1$ via control means 60. It is to be understood that the stage 1050 may be accomplished before, contemporaneously with or immediately after stage 1060 without exceeding the scope of the invention. In an exemplary embodiment, as described above in relation to Table I and Table II, the operation of control means 60 and 70 are gated to control means 120.

Thus, the present embodiments enable a bypass path to the unidirectional current means preventing a discharge of an output capacitor. The bypass path is operated by a control circuit just before, or substantially contemporaneously with, the disabling of power to the port. In an exemplary embodiment disabling of power to the port occurs in response to a sensed disconnect. The sensed disconnect may in one embodiment be a result of sensing an invalid AC or DC MPS. The bypass path prevents an excess voltage from appearing at the control circuit by presenting a discharge path for the output capacitor.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A circuit comprising:
    a means for receiving power;
    a control circuit;
    a first switching means responsive to said control circuit for alternatively connecting and disconnecting said received power to an output port;
    a source impedance operatively connected to present a source impedance associated with the output port in an event of said received power being connected by said first switching means to the output port;
    an output capacitor associated with the output port;
    a means for unidirectional current flow operatively connected between said source impedance and said output capacitor, said means for unidirectional current flow preventing discharge of said output capacitor through said source impedance in the event of said power being disconnected by said first switching means from the output port; and
    a second switching means responsive to said control circuit to alternatively enable and disable a bypass path respective to said means for unidirectional current flow, said control circuit being operative via the operation of said second switching means to enable said bypass path prior to or substantially simultaneously with the operation of said first switching means to disconnect said received power from the output port,
    whereby said bypass path enables a discharge path for said output capacitor via said source impedance.

2. A circuit according to claim 1, further comprising line detection means responsive to said control circuit, said control circuit being further operative via the operation of said second switching means to disable said bypass path during operation of said line detection means.

3. A circuit according to claim 2, wherein said line detection means comprises one of a controllable current source and a plurality of current sources.

4. A circuit according to claim 1, further comprising a means for sensing a voltage at the output port, said means for sensing being operatively connected to said control circuit.

5. A circuit according to claim 4, wherein said control circuit is operative to monitor a maintain power signature via said means for sensing.

6. A circuit according to claim 5, wherein said control circuit is operative to disconnect said power source from the output port responsive to an absence of said monitored maintain power signature.

7. A circuit according to claim 4, further comprising a means for connecting a non-uniform signal to said output port, said control circuit sensing a condition of said non-uniform signal at said output port via said means for sensing.

8. A circuit according to claim 7, wherein said control circuit is operative responsive to a pre-determined condition of said sensed condition of said non-uniform signal at said output port to disconnect said received power from the output port.

9. A circuit according to claim 1, wherein said source impedance is greater than 25K ohms.

10. A method for preventing an excess voltage from appearing at an output port of a power over Ethernet controller, the method comprising:
providing a source impedance associated with the output port of the power over Ethernet controller;
providing a unidirectional current flow means arranged to prevent discharge of an output capacitor associated with the output port of the power over Ethernet controller via said provided source impedance;
sensing that a powered device has been disconnected from the output port;
enabling a bypass path around said provided unidirectional current flow means responsive to said sensed powered device disconnect; and
disconnecting power to the output port responsive to said sensed powered device disconnect,
whereby said enabled bypass path provides a discharge path for the output capacitor associated with the output port of the power over Ethernet controller through said provided source impedance.

11. A method according to claim 10, further comprising prior to said sensing, detecting a powered device connected to the output port.

12. A method according to claim 11, further comprising prior to said sensing and subsequent to said detecting, connecting power to the output port.

13. A method according to claim 10, wherein said sensing is responsive to a condition of a maintain power signature.

14. A method according to claim 13, wherein said maintain power signature is one of an AC component and a DC component.

15. A circuit comprising:
a control circuit;
a means responsive to said control circuit for controlling a first switching means to alternatively connect and disconnect power to an output port;
a means for connecting a source impedance to be associated with the output port in an event of said power being connected by the first switching means to the output port;
a means for connecting an output capacitor to present an output capacitance associated with the output port;
a means for connecting a means for unidirectional current flow between the source impedance and the output capacitor, the means for unidirectional current flow preventing discharge of the output capacitor through the source impedance in the event of the power being disconnected by the first switching means from the output port; and
a means responsive to said control circuit for controlling a second switching means to alternatively enable and disable a bypass path respective to said means for unidirectional current flow,
said control circuit being operative to operate said second switching means thereby enabling said bypass path prior to or substantially simultaneously with the operation of said first switching means to disconnect the power from the output port,
whereby said bypass path enables a discharge path for the output capacitor via the source impedance.

16. A circuit according to claim 15, further comprising line detection means responsive to said control circuit, said control circuit being further operative to disable said bypass path during operation of said line detection means.

17. A circuit according to claim 16, wherein said line detection means comprises one of a controllable current source and a plurality of current sources.

18. A circuit according to claim 15, further comprising a means for sensing a voltage at the output port, said means for sensing being operatively connected to said control circuit.

19. A circuit according to claim 18, wherein said control circuit is operative to monitor a maintain power signature via said means for sensing.

20. A circuit according to claim 19, wherein said control circuit is operative via said means for controlling a first switching means to disconnect the power from the output port responsive to an absence of said maintain power signature.

21. A circuit comprising:
a means for receiving power;
a control circuit;
a first switching means responsive to said control circuit for alternatively connecting and disconnecting said received power to an output port;
a source impedance associated with the output port;
an output capacitor associated with the output port;
a means for unidirectional current flow operatively connected between said source impedance and said output capacitor, said means for unidirectional current flow being arranged to prevent discharge of said output capacitor through said source impedance in an event of said power being disconnected by said first switching means from the output port; and
a second switching means responsive to said control circuit to alternatively enable and disable a bypass path respective to said means for unidirectional current flow,
said control circuit being operative via operation of said second switching means to enable said bypass path prior to or substantially simultaneously with the operations of said first switching means to disconnect said received power from the output port,
whereby said bypass path enables a discharge path for said output capacitor via said source impedance.

22. A circuit according to claim 21, further comprising line detection means responsive to said control circuit, said control circuit being further operative via the operation of said second switching means to disable said bypass path during operation of said line detection means.

23. A circuit according to claim 22, wherein said line detection means comprises one of a controllable current source and a plurality of current sources.

24. A circuit according to claim 21, further comprising a means for sensing a voltage at the output port, said means for sensing being operatively connected to said control circuit.

25. A circuit according to claim 24, wherein said control circuit is operative to monitor a maintain power signature via said means for sensing.

26. A circuit according to claim 25, wherein said control circuit is operative to disconnect said power source from the output port responsive to an absence of said monitored maintain power signature.

27. A circuit according to claim 24, further comprising a means for connecting a non-uniform signal to said output port, said control circuit sensing a condition of said non-uniform signal at said output port via said means for sensing.

28. A circuit according to claim 27, wherein said control circuit is operative responsive to a pre-determined condition of said sensed condition of said non-uniform signal at said output port to disconnect said received power from the output port.

29. A circuit according to claim 21, wherein said source impedance is greater than 25K ohms.

30. A power over Ethernet controller comprising:
a means for receiving power;
a control circuit;
a first switching means responsive to said control circuit for alternatively connecting and disconnecting said received power to an output port;
a source impedance operatively connected to present an output impedance associated with the output port;
an output capacitor operatively connected to present an output capacitance associated with the output port;
a means for unidirectional current flow operatively connected between said source impedance and said output capacitor, said means for unidirectional current flow being arranged to prevent discharge of said output capacitor through said source impedance in an event of said power being disconnected by said first switching means from the output port; and
a second switching means responsive to said control circuit to alternatively enable and disable a bypass path respective to said means for unidirectional current flow,
said control circuit being operative via operation of said second switching means to enable said bypass path prior to or substantially simultaneously with the operation of said first switching means to disconnect said received power from the output port,
whereby said bypass path enables a discharge path for said output capacitor via said source impedance.

31. A method for preventing an excess voltage from appearing at an output port of a power over Ethernet controller, the method comprising:
providing a source impedance associated with the output port of the power over Ethernet controller;
providing a unidirectional current flow means arranged so as to prevent discharge of an output capacitor present across the output port of the power over Ethernet controller via said provided source impedance;
sensing that a powered device has been disconnected from the output port;
enabling a bypass path around said provided unidirectional current flow means responsive to said sensed powered device disconnect; and
disconnecting power to the output port responsive to said sensed powered device disconnect,
whereby said enabled bypass path enables a discharge path for the output capacitor present across the output port via said provided source impedance.

* * * * *